J. W. BARBER.
COUPLING OR CLUTCH.
APPLICATION FILED AUG. 19, 1916.
1,342,936.
Patented June 8, 1920.
2 SHEETS—SHEET 2.
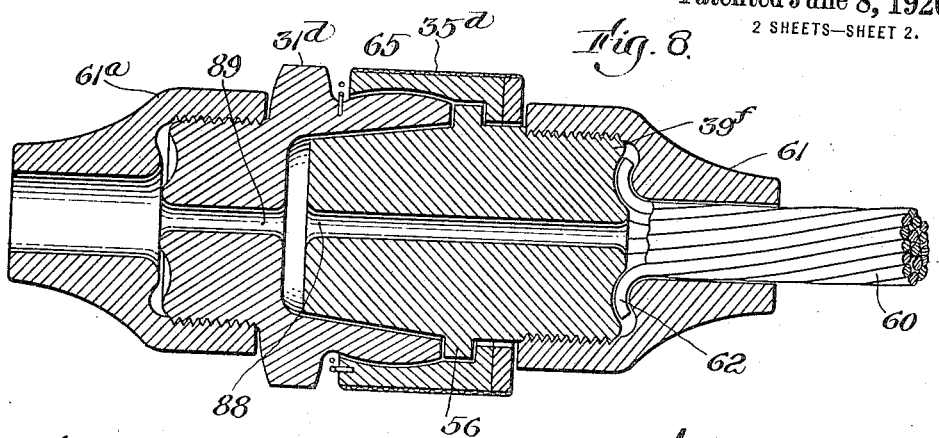
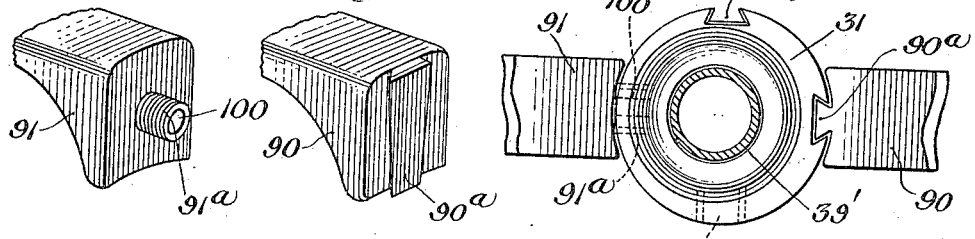
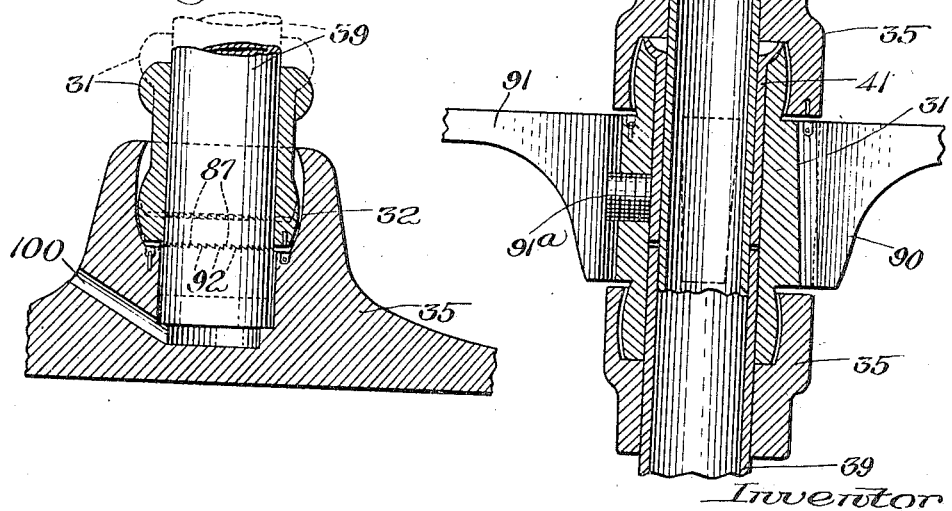
Inventor
John Wesley Barber

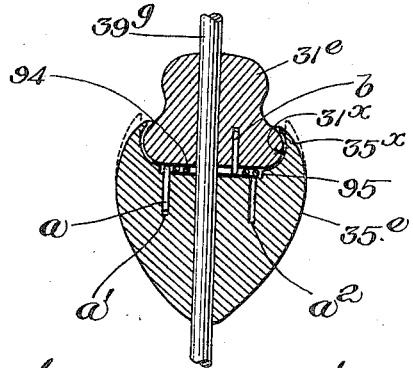
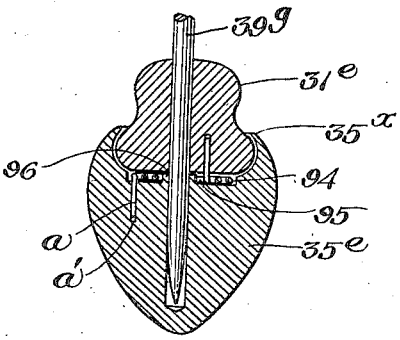
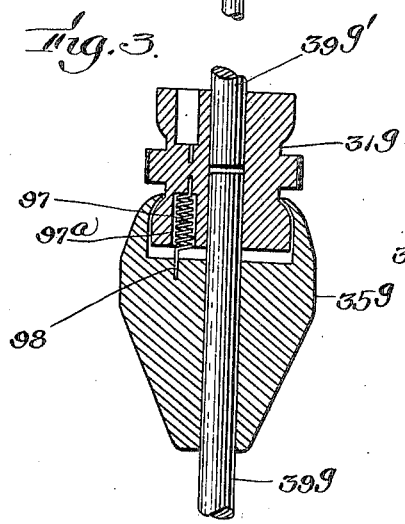
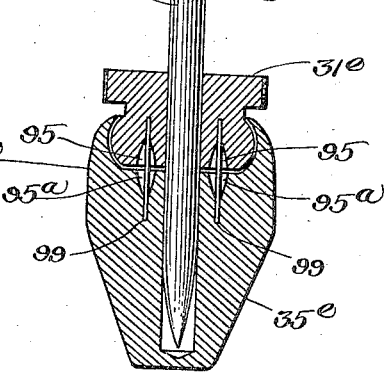
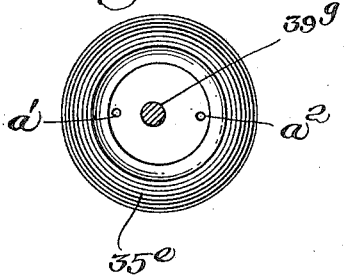
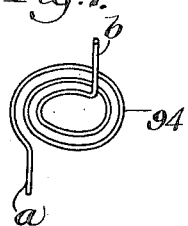
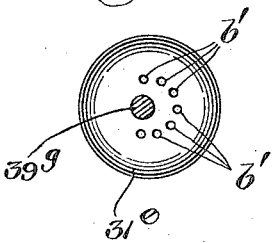

UNITED STATES PATENT OFFICE.

JOHN WESLEY BARBER, OF NEWTON, MASSACHUSETTS.

COUPLING OR CLUTCH.

1,342,936.          Specification of Letters Patent.          Patented June 8, 1920.

Application filed August 19, 1916. Serial No. 115,889.

*To all whom it may concern:*

Be it known that I, JOHN WESLEY BARBER, citizen of the United States, residing at Newton, in the county of Middlesex and State of Massachusetts, have invented new and useful Improvements in Couplings or Clutches, of which the following is a specification.

The present invention relates to devices of the general nature illustrated in my prior Letters Patent of the United States, numbered 1,214,985 and dated February 6, 1917, which serves the purpose of a coupling to join two pipes, rods, wires, etc., together, or a clutch or binding element adapted to be mounted on a pipe, rod, wire, or the like, and secured in a firm manner.

The coupling or clutch of the type mentioned comprises two members each having a bore to receive the part or the parts on which the elements of the device are mounted, and said members having interengaging surfaces of revolution which are eccentric to said bores. Various forms and modifications of the device embody more than the two members above referred to, but such two members are present in all forms and constitute the irreducible minimum number of parts of which the device may be made.

The present invention has for its object to provide in connection with a coupling or clutch of the character described, means constructed and arranged either to exert a constant tendency tending to place the members of the device in gripping position, or to retain said members in such position when they have once been put in that position by application of external force. A further object is to provide means or provisions by which a hermetically tight union may be made between the parts of the coupling or clutch and the elements which are connected and coupled thereto.

A feature of the prior patent referred to consists in an essentially conical formation of the overlapping parts of the complemental gripping members of the device, whereby the part of one member which lies outside of the complemental engaging part of the other member is caused also to lie back of such part when the members are in gripping relation for the purpose of preventing axial separation thereof. This feature is also shown in the drawings of the present application, but it is not an essential element of the present invention, and is therefore not included in all of the claims.

In the drawings which form a part of this application,

Figures 1, 2, 3, and 4 are longitudinal central sectional views of one type of coupling or clutch exemplified in three modifications equipped with automatic means for exerting a tendency to place the elements of the device in binding or clutching relation.

Figs. 5 and 6 are plan views of those parts which may be described, with reference to the position illustrated in the sectional views, as respectively the lower and upper elements of the device.

Fig. 7 is a perspective view of one form of spring which constitutes the means tending to place the members in gripping relation.

Fig. 8 is a longitudinal sectional view of another modification of coupling device adapted particularly for connecting electrical conductors, and having means for excluding air from its interior and making a hermetic seal between the several parts and the members coupled thereby.

Fig. 9 is a sectional view of another form of coupling or binder illustrating another embodiment of means for securing or retaining the elements in gripping relation.

Fig. 10 is a plan view, and

Fig. 11 a longitudinal sectional view of another form of coupling, with laterally extending members as well as with longitudinally extending members.

Figs. 12 and 13 are perspective views of the adjacent ends of laterally extending members which are adapted to be connected with the last described coupling.

The same reference characters indicate the same parts in all the figures.

In Figs. 1 and 2, $31^e$ and $35^e$ represent, respectively, the two essential elements or parts of the coupling or clutch. Each of these parts has a bore or passage adapted to be slipped on a rod or wire $39^g$, or any other element inserted permitting a binding action thereon, such as a pipe, and having the proper size to fit said bores or passages with clearance less than the eccentricity of the complemental gripping surfaces presently to be described. The member $35^e$ has an annular lip $35^x$ which surrounds the adjacent part of the member $31^e$. This lip on its inner surface and the adjacent outer surface 31ˣ of the other member are surfaces of revolution eccentric to the bores of the respective members. Thus when one member is turned relatively to the other about the rod 39ᵍ, these surfaces are gripped together, and the members are pressed from relatively opposite directions against the rod 39ᵍ. Thus the clutching action is effected in essentially the manner explained in my prior patent referred to. The lip 35ˣ is here shown as being offset to lie back of the laterally protuberant part of the surface 31ˣ, said lip and the complemental part forming interlocking means to prevent endwise separation of the members. This is the feature previously mentioned as being set forth in my prior patent and is not essential to the present invention.

The novel feature of the present invention as here depicted consists of a spring 94 coiled around the axis of the clutch and set in a recess 95 in the member 35ᵉ. In the form shown in Figs. 1 and 2 the spring is a flat coil. One end, $a$, of the spring is preferably anchored in a socket $a'$ in the member 35ᵉ, while its other end $b$ is placed in a similar socket $b'$ in the member 31ᵉ. This spring is so formed and positioned that it is put under tension when the members are brought with their bores in exact alinement, whereby it tends, and so acts upon release of the members, to swing one of them into the gripping relation. In Fig. 2 the spring is coiled in a chamber the inner wall of which holds spring 94 out of contact with rod 39ᵍ.

As appears from Fig. 5 the member 35ᵉ has two sockets $a'$ and $a^2$ at opposite sides of its bore, either of which may receive the end $a$ of the spring to admit springs coiled in either direction so as to act either clockwise or anti-clockwise. The member 31ᵉ has a number of sockets $b'$ arranged substantially as shown in Fig. 6 any one of which is adapted to admit the spring end $b$, to permit of the spring being engaged with varying degrees of tension; in other words, to permit of such placement of the spring that when the members are set with their bores in exact alinement the spring is distorted to a greater or less degree, as desired.

The corresponding members 31ᵍ and 35ᵍ shown in Fig. 3 are actuated by a helical spring 97, one end of which is anchored in a socket in the member 35ᵍ and the other end similarly placed in a corresponding socket in member 31ᵍ. The member 31ᵍ has a recess or chamber 97ᵃ which admits the entire body of the spring. The recess, or its equivalent, may be formed for the spring in any of the devices in either members 31ᵍ and 35ᵍ or in both. The member 31ᵍ is here shown with a duplicate of chamber 97ᵃ by which two bodies, 39ᵍ and 39ᵍ′ could be clamped or coupled by addition of 35ᵍ and spring 97.

In Fig. 4 straight springs 99 are shown anchored in deep sockets 95, 95ᵃ of the clutch members. The outer portions of these sockets are made flaring or enlarged to give freedom for the flexure of the springs necessary to permit turning of one member relatively to the other.

In Fig. 9 similar clutch or coupling members 31 and 35 are shown, the former having a projection 32 which enters a socket in the adjacent end of the member 35, the contiguous surfaces of revolution of this projection and socket being eccentric to the bores of the respective members. On the end of the projection 32 and in the bottom of the recess of the member 35 are complemental ratchet teeth 87 and 92, respectively, which permit one of the members to be turned relatively to the other in the binding direction and prevent return of said members into the releasing position until member 31 is raised for releasing element 39.

Figs. 9, 10, 11, 12 and 13, together comprise a novel and complete device embodying two different forms of coupling for clutching pipes of two sizes as shown in said prior patent but with the addition of ratchets 87 and 92 in the base member and with laterally projecting arms 90, 91 in top member Fig. 11. Two embodiments of means for attaching said arms are here shown; one consisting of a dove-tailed rib 90ᵃ on the end of rib 90, entering a complemental groove in the side of the member 31, and the other being a threaded stud 91ᵃ on the arm 91, which is screwed into a tapped hole in the side of the member 31. The coupling members 35, or one of them, serve to retain the arms 90 and 91, preventing their removal. Figs. 9, 12, and 10 also show openings 100 permitting flexible pipe, wires, or tubing to be introduced.

Fig. 8 shows complemental binding elements 31ᵈ and 35ᵈ which are adapted to be coupled in the manner described, one member being a block 39ᶠ having a shoulder 56 which is engaged with the coupling member 35ᵈ. The tapered end of the block 39ᶠ, formed as a plug, fits a complementally tapered chamber in the member 31ᵈ. 61 and 61ᵃ are attaching devices, formed as binding sleeves threaded upon the members 39ᶠ and 31ᵈ, respectively, to clamp the ends of the parts which are coupled, one of such coupled parts being shown as an electrical conductor 60. The holes 88 and 89 in the members 39ᶠ and 31ᵈ represent passages through which a fluid sealing material, such for example, as molten solder, may be admitted for the purpose of displacing air from the interior of the coupling and of making a hermetic, secure, and electrically conductive joint with the coupled conductors; the solder being introduced into each member before coupling them together, the members having previously been warmed.

At the same time the spaces between the several adjacent members, including the element 31ᵈ, plug 39ᶠ and attaching devices or clamps 61, 61ᵃ, are adapted to admit packing members or means of any desired character of such form as to surround, without obstructing, the continuous passage through the coupling from the outer end of one sleeve 61 to the opposite end of the opposite sleeve 61ᵃ. To explain: it will be observed that shoulders are formed on the inner end sleeve 61 and the plug 31ᶠ, between which is a space 62; that similar shoulders with a space between them are provided on the sleeve 61ᵃ, and the element 31ᵈ; and that on the inner end of the plug block 39ᶠ and the bottom of the socket in the element 31ᵈ are shoulders surrounding the adjacent ends of the holes or passages 88 and 89 in said plug and member, respectively, between which shoulders there is a space. In each of these spaces (the cable 60 being removed) may be placed an annular packing, and such packings may be compressed by setting up the parts of the coupling, which then has a continuous passage, packed against leakage, which may also be provided with a continuous elastic lining, made in sections, one section to each member of the coupling, and the sections of such lining connected at their ends to the packing members which are adapted to be placed as above described. By making such linings and packings of elastic non-metallic substance, the fluid passing through the coupling may be prevented from coming in contact with the metal. Evidently either one of the clamping sleeves is adapted to secure the end of a pipe or hose as well as a cable, the use for such purpose being indicated by Fig. 11.

What I claim and desire to secure by Letters Patent is:

1. A coupling or clutch, comprising complemental members having interior bores to permit mounting of elements inserted, and having interengaging surfaces of revolution eccentric to said bores, in combination with resilient pressure-applying means connected with said members and normally exerting force tending to place them in the gripping or clutching position.

2. A coupling or clutch comprising essentially two complemental members having interengaging surfaces of revolution of which one is surrounded by the other, and also having inner bores eccentric to said complemental surfaces, and means constructed and adapted to hold said members in any one of several different positions wherein their bores are out of alinement.

3. A device of the character described comprising essentially two members, one having a substantially cone surfaced portion fitting within a complemental surrounding substantially cone surfaced portion of the other, each member having a bore eccentric to its cone surfaced portion in position to be placed in alinement with the bore of the other member by relative rotation of such members and means tending to cause relative rotation of said members about their axis.

4. A coupling or clutch comprising complemental members having interengaging surfaces of revolution of which one is surrounded by the other, and also having inner bores eccentric to said complemental surfaces and a spring interposed between said members tending to place the same in the gripping or clutching position, one of said members having a recess in which said spring is wholly contained, and the other having a socket receiving an outward projection from the spring.

5. A coupling device comprising complemental members each having a bore and complemental gripping surfaces eccentric to said bores, the surface on one of said members surrounding and fitting the complemental surface on the other, a plug entering one of said members, attaching devices on said plug and on the other of said members respectively, and said plug and said other member having passages to admit a sealing plastic material for excluding air and forming hermetic joints with the members coupled thereby.

6. A coupling or clutch comprising complemental members having substantially coaxial bores and external complemental gripping surfaces of revolution eccentric to said bores, in combination with resilient pressure applying means connected to said members and normally exerting force tending to place them in the gripping or coupling position, and a laterally extending arm detachably coupled to one of said coupling members.

7. A coupling device comprising complemental members each having a bore and complemental gripping surfaces eccentric to said bores, the surface of one of said members surrounding and fitting the complemental surface of the other, resilient pressure-applying means connected with said members and normally under stress tending to place said members in the gripping relation, a plug entering one of said members, attaching devices associated with said plug and the other of said members respectively, and said plug and said other member having recesses to admit a sealing plastic material for excluding air and for making hermetic joints with the members coupled thereby.

8. A coupling device comprising complemental members each having a bore and complemental gripping surfaces eccentric to said bores, the surface of one of said members surrounding and fitting the complemental surface of the other, resilient pressure-applying means connected with said members and normally under stress tending to place said members in the gripping relation, a plug entering one of said members, attaching devices associated with said plug and the other of said members respectively, and said plug and said other member having recesses to admit a sealing plastic material for excluding air and for making hermetic joints with the members coupled thereby, and a laterally extending arm detachably coupled to one of said coupling members.

9. A coupling comprising complemental members having substantially coaxial bores and external complemental gripping surfaces of revolution eccentric to said bores, a plug entering one of said members and being surrounded by the other and coupled therewith in a rotation permitting engagement, clamping means associated with said plug and with the other of said members, the last-named member and plug having recesses to receive a sealing plastic material, and a laterally extending arm detachably coupled to one of said coupling members.

10. A coupling comprising complemental members each having a bore and complemental relatively rotatable gripping members eccentric to said bores, and a plug entering one of said members and surrounded by and engaged with the other of said members, the said plug and the member entered thereby having communicating passages and their contiguous ends being arranged with a continuous space surrounding the adjacent ends of said passages.

11. A coupling comprising complemental members each having a bore and complemental relatively rotatable gripping members eccentric to said bores, a plug entering one of said members and surrounded by and engaged with the other of said members, the said plug and the member entered thereby having communicating passages and their contiguous ends being formed with shoulders surrounding the adjacent ends of said passages separated one from another to provide an annular space, and attaching devices mounted on the outer ends of said plug and of the member which is entered thereby, respectively, each having a passage in continuation of the aforesaid passages and a shoulder surrounding the inner end of such passage adapted to clamp an interposed piece against the adjacent end of the plug or of the member entered thereby, respectively.

12. A coupling comprising complemental members having interchanging coupling surfaces, one of which surrounds the other, one of said members having a socket eccentric to said clutching surfaces, a plug entering said socket and surrounded by and engaged with the other of said members, the said plug and socketed member each having a communicating passage and a shoulder surrounding the adjacent end of its passage; said shoulders being separated one from another to provide a space.

In testimony whereof I have affixed my signature.

JOHN WESLEY BARBER.